(12) United States Patent
Katayama et al.

(10) Patent No.: US 10,466,426 B2
(45) Date of Patent: Nov. 5, 2019

(54) OPTICAL FIBER DRAWER STRUCTURE AND OPTICAL MODULE

(71) Applicant: FURUKAWA ELECTRIC CO., LTD., Tokyo (JP)

(72) Inventors: Etsuji Katayama, Tokyo (JP); Masakazu Yoshihara, Tokyo (JP); Yuta Ishige, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/001,117

(22) Filed: Jun. 6, 2018

(65) Prior Publication Data

US 2018/0284365 A1  Oct. 4, 2018

Related U.S. Application Data

(63) Continuation of application No. PCT/JP2016/086173, filed on Dec. 6, 2016.

(30) Foreign Application Priority Data

Dec. 7, 2015  (JP) ................................ 2015-238544

(51) Int. Cl.
 *G02B 6/38* (2006.01)
 *G02B 6/42* (2006.01)
(52) U.S. Cl.
 CPC ......... *G02B 6/3897* (2013.01); *G02B 6/4296* (2013.01); *G02B 6/3861* (2013.01); *G02B 6/4214* (2013.01)

(58) Field of Classification Search
 CPC ..................... G02B 6/262; G02B 6/42; G02B 6/4201–4204; G02B 6/4206;
 (Continued)

(56) References Cited

U.S. PATENT DOCUMENTS 4,762,385 A * 8/1988 Fuse .................... G02B 6/4296
 385/126
5,946,437 A * 8/1999 Uchida ................ G02B 6/4296
 385/139

(Continued)

FOREIGN PATENT DOCUMENTS

JP  H5-341138 A  12/1993
JP  H06-059133 A  3/1994

(Continued)

OTHER PUBLICATIONS

International Search Report issued in PCT/JP2016/086173 dated Mar. 7, 2017.

*Primary Examiner* — Robert Tavlykaev
(74) *Attorney, Agent, or Firm* — Marshall, Gerstein & Borun LLP

(57) ABSTRACT

A drawer structure, etc. of an optical fiber from an optical module is disclosed. An optical fiber drawer structure is configured by a roughly cylindrical passage through which an optical fiber passes being connected to a housing. The passage includes a sleeve connected to an outer periphery of the housing and a lid part connected to a tip side of the sleeve. The interior of the passage (sleeve) is provided with a fixing member to fix the optical fiber to the passage. A reduced diameter part and an expanded diameter part are formed in the lid part.

12 Claims, 8 Drawing Sheets

(58) Field of Classification Search
CPC .. G02B 6/4219; G02B 6/3854; G02B 6/3869; G02B 6/4296
USPC .............................................. 385/88, 92–94
See application file for complete search history.

(56) References Cited

U.S. PATENT DOCUMENTS

| | | | | |
|---|---|---|---|---|
| 6,220,764 | B1* | 4/2001 | Kato | G02B 6/3865 264/1.25 |
| 6,347,178 | B1* | 2/2002 | Edwards | G02B 6/4296 385/139 |
| 6,953,288 | B2* | 10/2005 | Foley | G02B 6/4292 385/60 |
| 8,064,742 | B2* | 11/2011 | Watanabe | G02B 6/262 385/127 |
| 9,798,095 | B2* | 10/2017 | Fujiwara | G02B 6/3885 |
| 2001/0006573 | A1 | 7/2001 | Weigel | |
| 2004/0247240 | A1* | 12/2004 | Teramura | G02B 6/4206 385/27 |
| 2013/0011102 | A1* | 1/2013 | Rinzler | G02B 6/3813 385/89 |
| 2015/0016772 | A1* | 1/2015 | Arao | G02B 6/4273 385/14 |
| 2016/0246022 | A1 | 8/2016 | Ishige et al. | |

FOREIGN PATENT DOCUMENTS

| | | | | |
|---|---|---|---|---|
| JP | H11-515114 A | 12/1999 | | |
| JP | 2002-318329 A | 10/2002 | | |
| JP | 2011-164548 A | 8/2011 | | |
| JP | 2011-221541 A | 11/2011 | | |
| JP | 2013-235943 | * 11/2013 | ............ | H01S 5/022 |
| WO | WO-2015/037725 A1 | 3/2015 | | |

* cited by examiner

OPTICAL FIBER DRAWER STRUCTURE AND OPTICAL MODULE

TECHNICAL FIELD OF THE INVENTION

The present disclosure relates to a drawer structure of an optical fiber from an optical module, and the like.

BACKGROUND

Optical modules have been conventionally used for coupling light emitted from semiconductor lasers to optical fibers. In an optical module, lasers and lenses corresponding thereto are arranged and each laser beam is optically coupled into an optical fiber.

A flexible tube has been provided at an optical fiber drawer part, where an optical fiber is drawn out from a housing of the optical module. Using the flexible tube can prevent the optical fiber from fracturing or the like due to sudden bending at the optical fiber drawer part (see Japanese Unexamined Patent Application Publication No. H05-341138 (JP-A-H05-341138), for example).

The conventional drawer structure, however, uses a tube made of rubber or the like to protect the optical fiber, which leads to a complex structure with too many components and a high cost. Also, if optical output power continues to improve, cladding mode light of the optical fiber may leak to the tube outside the optical fiber and there is a fear that the tube may be heated and deteriorated or burned.

The presently disclosed embodiments are made in view of such problems. Its object is to provide a drawer structure of an optical fiber from an optical module, having a simple structure in which optical fiber fracturing hardly occurs, and the like.

SUMMARY OF THE DISCLOSURE

To achieve the above object, a first embodiment is an optical fiber drawer structure of an optical module including a housing in which optical components are accommodated, a sleeve which is disposed outside the housing and through which an optical fiber penetrates from an interior of the housing, a fixing member which is provided inside the sleeve and fixes the optical fiber to the sleeve, and a lid part formed with a reduced diameter part through which the optical fiber is inserted and an expanded diameter part, the reduced diameter part being provided at a tip of the sleeve and formed, on a cross section in an axial direction of the optical fiber, at a position that is a predetermined distance away from a fixing part of the optical fiber and the fixing member, the expanded diameter part being formed on a further tip side than the reduced diameter part and having a larger inner diameter than an inner diameter of the reduced diameter part. The reduced diameter part is formed, on the cross section in the axial direction of the optical fiber, to have approximately the same diameter within a predetermined length range in the axial direction of the optical fiber. The expanded diameter part is formed so as to be connected to the reduced diameter part.

The lid part is preferably made of flame-retardant material. In this case, the flame-retardant material may be metal or may be flame-retardant resin.

The expanded diameter part may have an inner diameter that increases gradually from the reduced diameter part toward a tip of the lid part.

On the cross section in the axial direction of the optical fiber, the expanded diameter part may be formed with an angle to the axial direction of the optical fiber increasing in stages.

On the cross section in the axial direction of the optical fiber, the expanded diameter part may be formed in a curve so that the diameter thereof expands toward the tip side.

The housing and the sleeve may be constructed as a unified body.

The sleeve and the lid part may be constructed as a unified body.

The fixing member may be made of glass.

A metal-made cylindrical member may be provided between the sleeve and the fixing member, and an inner surface of the cylindrical member may be in a state for absorbing light transmitting the optical fiber.

In this case, an inner surface of the sleeve may be in a state for absorbing light transmitting the optical fiber.

According to the first embodiment, the reduced diameter part and the expanded diameter part are formed in the sleeve, and this prevents the optical fiber from being suddenly bent at an exit side of the sleeve. Thus, fracturing or the like of the optical fiber can be prevented. Also, a rubber-made tube or the like is unnecessary for the sleeve. Thus, there is no fear of deterioration or burning of the tube due to cladding mode leaked light of the optical fiber, and the structure is simple.

Also, forming the lid part from flame-retardant material can prevent combustion of the lid part due to heat. Here, metal or flame-retardant resin is particularly preferable as the flame-retardant material.

Also, forming the inner diameter of the expanded diameter part gradually increasing from the reduced diameter part toward the tip of the lid part can ensure with more certainty that the optical fiber is prevented from sudden bending at the exit side of the sleeve.

Also, providing the lid part at the tip of the sleeve and forming the reduced diameter part and the expanded diameter part in the lid part facilitate manufacturing and simplify the structure.

Also, forming the reduced diameter part for a predetermined length can prevent the optical fiber from being bent at proximity of the fixing part of the optical fiber with certainty.

Also, forming the expanded diameter part so as to increase the angle thereof to the axial direction of the optical fiber in stages can prevent local bending of the optical fiber with more certainty.

Similarly, on the cross section in an axial direction of the optical fiber, forming the expanded diameter part in a curve so as to expand the diameter thereof toward a tip thereof can prevent local bending of the optical fiber with more certainty.

Also, if the fixing member is made of glass, cladding mode leaked light of the optical fiber can be introduced into the glass-made fixing member. At this time, a metal-made cylindrical member with a light absorbing surface plating or the like is provided on an outer periphery of the fixing member, and thus the cylindrical member absorb the leaked light and generated heat can be radiated through the sleeve to the housing and to the outside. Or, the cylindrical member is not always necessary and can be replaced by a member that can absorb leaked light, such as a surface plating with light absorption property applied on an interior wall of the sleeve. In such a case, cladding mode leaked light introduced into the glass-made fixing member transmits through the glass fixing member and enter the light-absorbing surface plating or the like applied on the interior wall of the sleeve member so that the leaked light can be absorbed and generated heat can be radiated through the sleeve to the housing.

Also, a clearance is provided between the fixing member and the lid part and, on the cross section in the axial direction of the optical fiber, the surfaces of the lid part facing the fixing member are tilted toward a direction of the cylindrical member. This allows the leaked light emitted from the cylindrical member to reflect toward the cylindrical member and to be absorbed efficiently by the cylindrical member as heat.

A second embodiment is an optical module including the optical fiber drawer structure according to the first embodiment, a semiconductor laser disposed inside the housing, a lens for coupling the light from the semiconductor laser with the optical fiber.

According to the second embodiment, an optical module of a simple structure that can prevent an optical fiber from fracturing or the like can be obtained.

The presently disclosed embodiments can provide a drawer structure of an optical fiber from an optical module having a simple structure in which optical fiber fracturing hardly occurs, and the like.

BRIEF DESCRIPTION OF DRAWINGS

FIG. 4A is a view showing a lid part 23a.

FIG. 4B is a view showing a lid part 23b.

FIG. 7 is a cross sectional view showing an optical fiber drawer structure 10a.

FIG. 8 is a cross sectional view showing another embodiment of the optical fiber drawer structure 10a.

DETAILED DESCRIPTION

Figure 1:
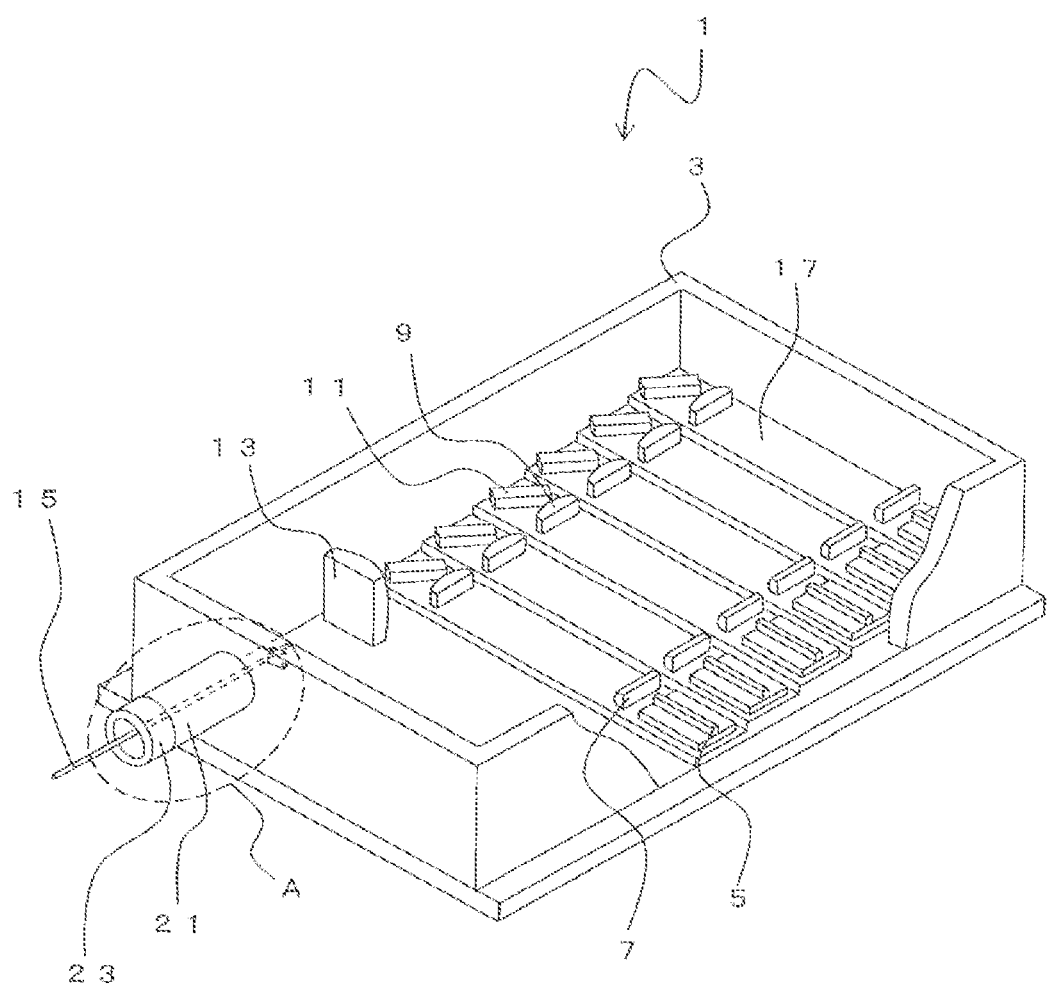
FIG. 1 is a perspective view showing an optical module 1.

Hereinafter, an embodiment will be described with reference to the accompanying drawings. FIG. 1 is a perspective view showing an optical module 1. In FIG. 1, an upper surface and a part of a sidewall on the front in the drawing of a housing 3 are shown as perspective. The optical module 1 mainly includes the housing 3, semiconductor lasers 5, lenses 7, 9, and 13, reflective mirrors 11, an optical fiber 15, and so on.

The housing 3 includes a bottom portion and side faces. The side faces rise approximately upright from the bottom portion of the housing 3. The housing 3 accommodates various optical components therein.

Inside the housing 3, the bottom portion is formed in tiers so that the level of the bottom portion gradually rises. Each tier forms a semiconductor laser installation platform 17. That is, the optical module 1 includes a plurality of the semiconductor laser installation platforms 17 formed in tiers. The semiconductor laser 5 is installed on each of the semiconductor laser installation platforms 17.

The lens 7 is disposed in front (in an emission direction) of the semiconductor laser 5. Also, the lens 9 is disposed in further front thereof. The lens 7 and the lens 9 are disposed for the every semiconductor laser 5 on the same semiconductor laser installation platform 17. The lenses 7 and 9 collimate light emitted from the semiconductor laser 5 in vertical and horizontal directions, respectively.

The reflective mirror 11 is fixed behind the lens 9. The reflective mirror 11 is disposed on the semiconductor laser installation platform 17. The reflective mirror 11 approximately perpendicularly reflects the above-mentioned light collimated by the lenses 7 and 9. The lens 7, the lens 9, and the reflective mirror 11, all having the same shape, can be used for the respective semiconductor laser 5.

On the bottom portion of the housing 3, the lens 13 is fixed directing toward a direction vertical to the emission direction of the semiconductor laser 5. The lens 13 concentrates laser beams reflected by the reflective mirrors 11. Also, at the rear side of the lens 13, the optical fiber 15 is provided so as to penetrate the housing 3. The laser beams concentrated by the lens 13 are coupled to the optical fiber 15.

That is, in the optical module 1, a plurality of the semiconductor lasers 5 are installed side by side on the semiconductor laser installation platforms 17 at respective levels and emit laser beams respectively in approximately the same direction. In the emission direction of the semiconductor lasers 5, the lens 7, the lens 9, and the reflective mirror 11 are disposed in sequence in the same direction. Thus, the laser beams are irradiated onto the reflective mirror 11 through the lenses 7 and 9. Furthermore, each of the reflective mirrors 11 reflects the laser beams toward approximately the same direction. The laser beams reflected by the respective reflective mirrors 11 are concentrated by the lenses 13 and coupled to the optical fibers 15. The number and arrangement etc. of the semiconductor lasers 5 are not limited to the illustrated example. For example, the number of the semiconductor lasers 5 is not limited to the illustrated example, and the reflective mirror 11 is not always necessary depending on the layout.

Figure 2:
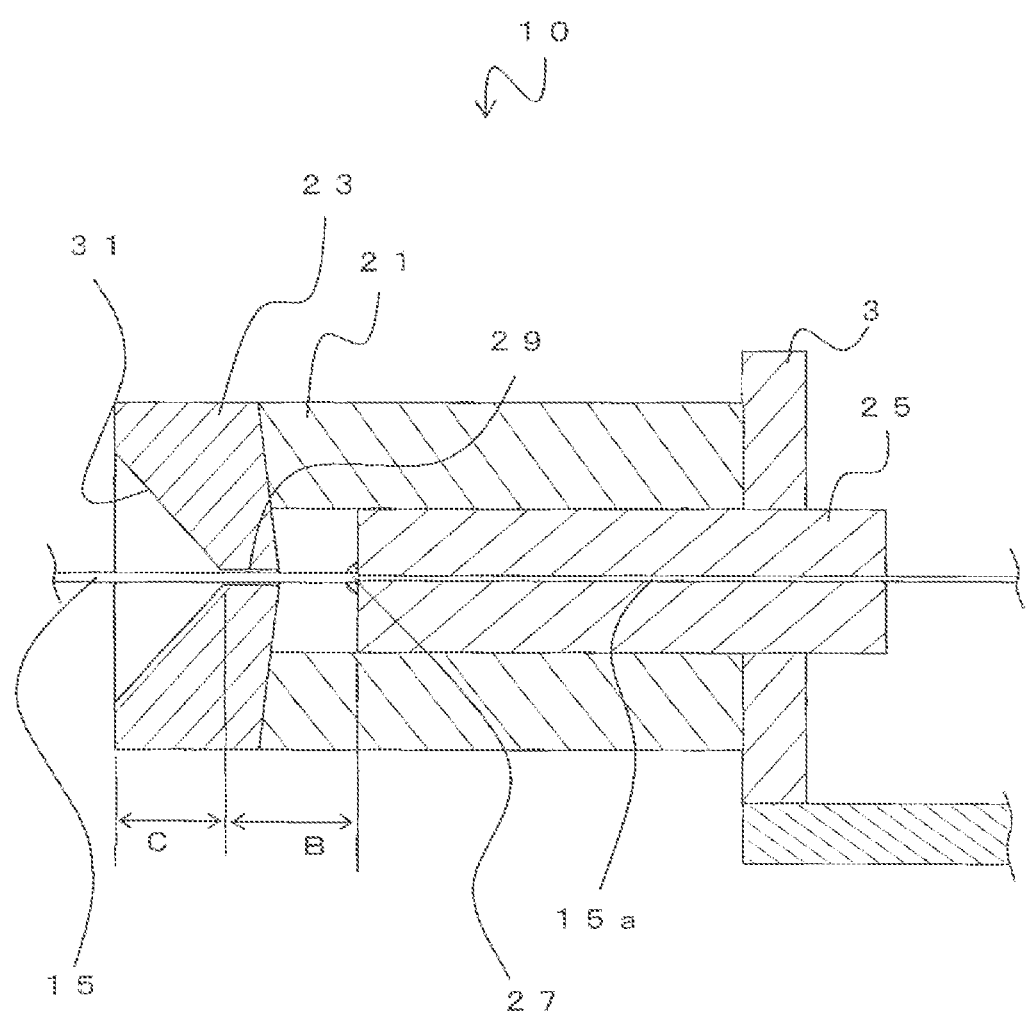
FIG. 2 is a partial cross sectional view of section A in FIG. 1 showing an optical fiber drawer structure 10.

FIG. 2 is an enlarged cross sectional view of A section in FIG. 1, and is a cross sectional view taken in an axial direction of the optical fiber 15 of an optical fiber drawer structure 10 of the optical module 1. The optical fiber drawer structure 10 is configured with a roughly cylindrical sleeve 21, through which the optical fiber 15 penetrates, being connected to the housing 3. The sleeve 21 is in a cylindrical shape, for example, but can be in any other shapes.

The optical fiber drawer structure 10 includes the sleeve 21, which is disposed outside the housing 3, and a lid part 23, which is connected to a tip side of the sleeve 21. The sleeve 21 and the lid part 23 may be made from the same material as, or different material from, the material used for the sidewalls of the housing 3, such as copper alloy, though not limited thereto. It is, however, preferable that the lid part 23 is made from flame-retardant material such as metal or flame-retardant resin. In the same way as in the housing 3, surfaces of the sleeve 21 and the lid part 23 are plated by metal, such as gold or nickel.

Inside the sleeve 21, a fixing member 25 for fixing the optical fiber 15 to the sleeve 21 is provided. The fixing member 25 is made from zirconia, for example. The optical fiber 15 penetrates through the fixing member 25. That is, the optical fiber 15 penetrates from the interior of the housing 3 to the sleeve 21.

Here, within a predetermined range from the interior of the housing 3 to the interior of the sleeve 21, the resin coating on an outer periphery of the optical fiber 15 is removed so as to be a bare optical fiber 15a. The fixing member 25 holds the bare optical fiber 15a. A tip of the bare optical fiber 15a (a border between the resin coating and non resin coating) is disposed at a position in a proximity of a tip of the fixing member 25, where the bare optical fiber 15a inserted through the fixing member 25 is fixed with an interior wall of an insertion through-hole of the fixing member 25 and, furthermore, the fixing member 25 is fixed with a border part of the resin coating of the optical fiber 15 at the fixing part 27 using an adhesive agent or the like. This fixing part 27 is formed of an adhesive agent, for example, and it is preferable for an optical absorption coefficient thereof to be small to a wavelength of the laser beam transmitting through the optical fiber 15.

Inside the lid part 23, a reduced diameter part 29 and an expanded diameter part 31 are formed. The reduced diameter part 29 having a relatively small diameter, with a hole diameter which is just enough for the optical fiber 15 to be inserted through, is formed at a rear part of the lid part 23 (on a side of the fixing member 25). The reduced diameter part 29 is a part holding the optical fiber at a position that is approximately center on a cross section in a diameter direction of the lid part 23. The size of the reduced diameter part depends on a coating diameter of the optical fiber: for example, if a diameter of the optical fiber 15 is 250 μm, the size of the reduced diameter part is approximately between 300 μm and 500 μm.

The expanded diameter part 31 is formed in front of the reduced diameter part 29 so as to be connected to the reduced diameter part 29. The expanded diameter part 31 is a part of which an inner diameter gradually expands from the reduced diameter part 29 toward the tip of the lid part 23. On a cross section taken in an axial direction of the optical fiber 15, an angle between the axial direction of the optical fiber 15 and an inner face of the expanded diameter part 31 is 45°, for example, or may be any other angle. Also, it is not necessarily limited to the case in which the inner diameter gradually increases from the reduced diameter part 29 to the tip of the lid part 23, and there can be a level difference between the expanded diameter part 31 and the reduced diameter part 29 as long as the expanded diameter part 31 with a larger inner diameter than that of the reduced diameter part 29 is formed further on the tip side than the reduced diameter part 29.

On a cross section in the axial direction of the optical fiber, the reduced diameter part 29 of the lid part 23 is formed inside the lid part 23 with an approximately uniform diameter within a predetermined length range to the axial direction of the optical fiber 15. That is, a predetermined length of the reduced diameter part 29 is formed from the rear part of the lid part 23.

Figure 3:
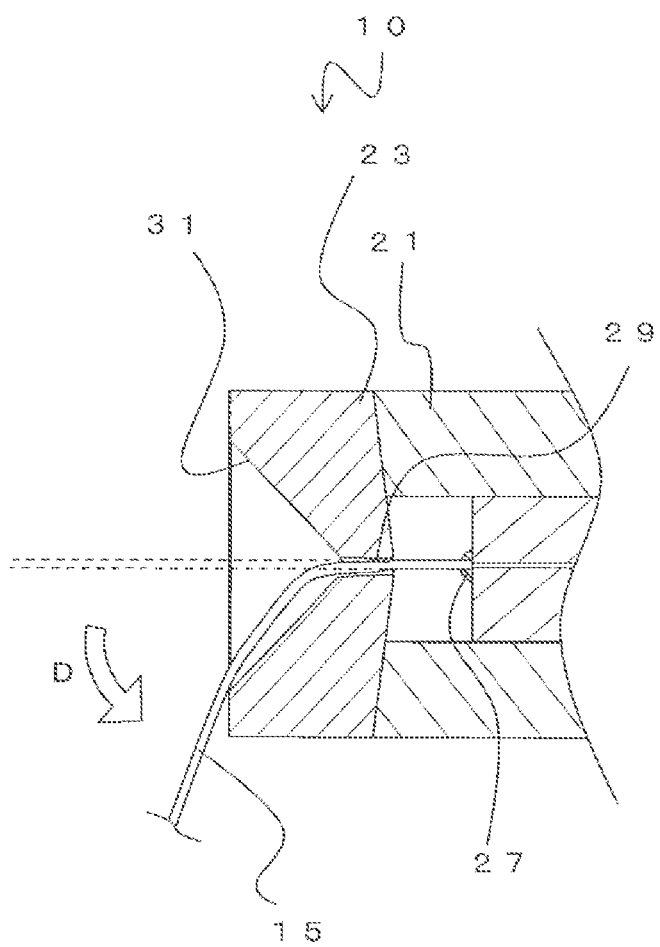
FIG. 3 is a view showing a state in which an optical fiber 15 is bent.

FIG. 3 shows a state in which a force in a direction that is approximately vertical to the axial direction of the optical fiber 15 (an arrow D in the drawing) is applied to the optical fiber 15 being drawn from the lid part 23. When the optical fiber 15 is bent approximately vertically to the axial direction thereof, the optical fiber 15 bends from the reduced diameter part 29 along the expanded diameter part 31. Thus, it is possible to prevent local large bending given to the optical fiber 15.

Here, there is a clearance formed between a tip of the fixing member 25 and the lid part 23. Thus, on the cross section in the axial direction of the optical fiber 15, the reduced diameter part 29 is formed at a position that is a predetermined distance away from a fixing part 27, which fixes the optical fiber 15 and the fixing member 25. In this way, it is possible to reduce an effect of bending of the optical fiber 15 to be given to proximity of the fixing part 27 when the optical fiber 15 is bent.

The distance from the fixing part 27 to the tip of the reduced diameter part 29 (a border with the expanded diameter part 31) (B in FIG. 2) may be approximately 1 to 5 mm, for example. Also, the length of the expanded diameter part 31 (C in FIG. 2) may be approximately 2 mm, for example. In the presently described embodiments, the distance between the fixing part 27 and the reduced diameter part 29 when the reduced diameter part 29 is formed for a predetermined length is a distance between the fixing part 27 and the tip of the reduced diameter part 29. Thus, in the present embodiment, the reduced diameter part 29 is formed at a position that is a predetermined distance away from the fixing part 27.

There may not be a clearance of a predetermined length between the fixing member 25 and the lid part 23. That is, the tip of the fixing member 25 may be in contact with the rear end of the lid part 23 as long as it is ensured that there is a distance between the fixing part 27 and the tip of the reduced diameter part 29 (B in the drawing).

Figure 4:
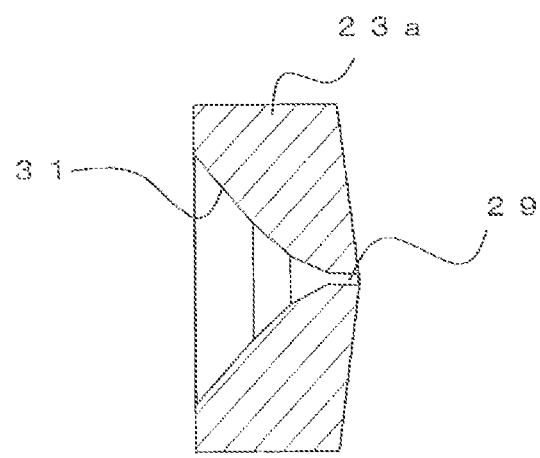
Figure 4:
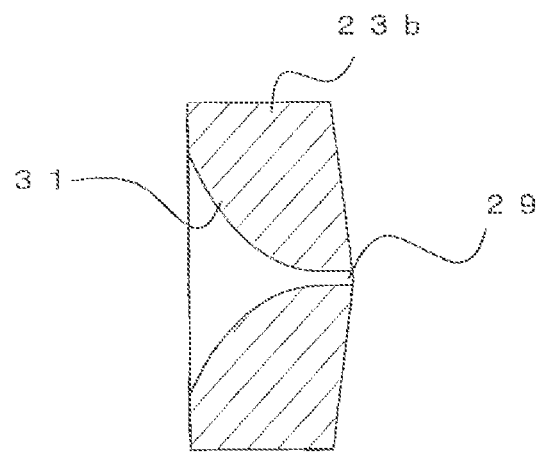

The shape of the expanded diameter part 31 is not limited to a linear tapered shape. For example, as a lid part 23a shown in FIG. 4A, the expanded diameter part 31 may be formed so that the angle to the axial direction of the optical fiber 15 on the cross section in the axial direction of the optical fiber 15 increases in stages toward the tip. That is, on the cross section in the axial direction of the optical fiber 15, the angle of the expanded diameter part 31 to the axial direction of the optical fiber 15 may vary in several stages.

Also, as a lid part 23b shown in FIG. 4B, on the cross section in the axial direction of the optical fiber, the expanded diameter part 31 may be formed in a curve so that the diameter thereof expands toward the tip. That is, on the cross section in the axial direction of the optical fiber 15, the expanded diameter part 31 may be formed in a trumpet shape.

Figure 5:
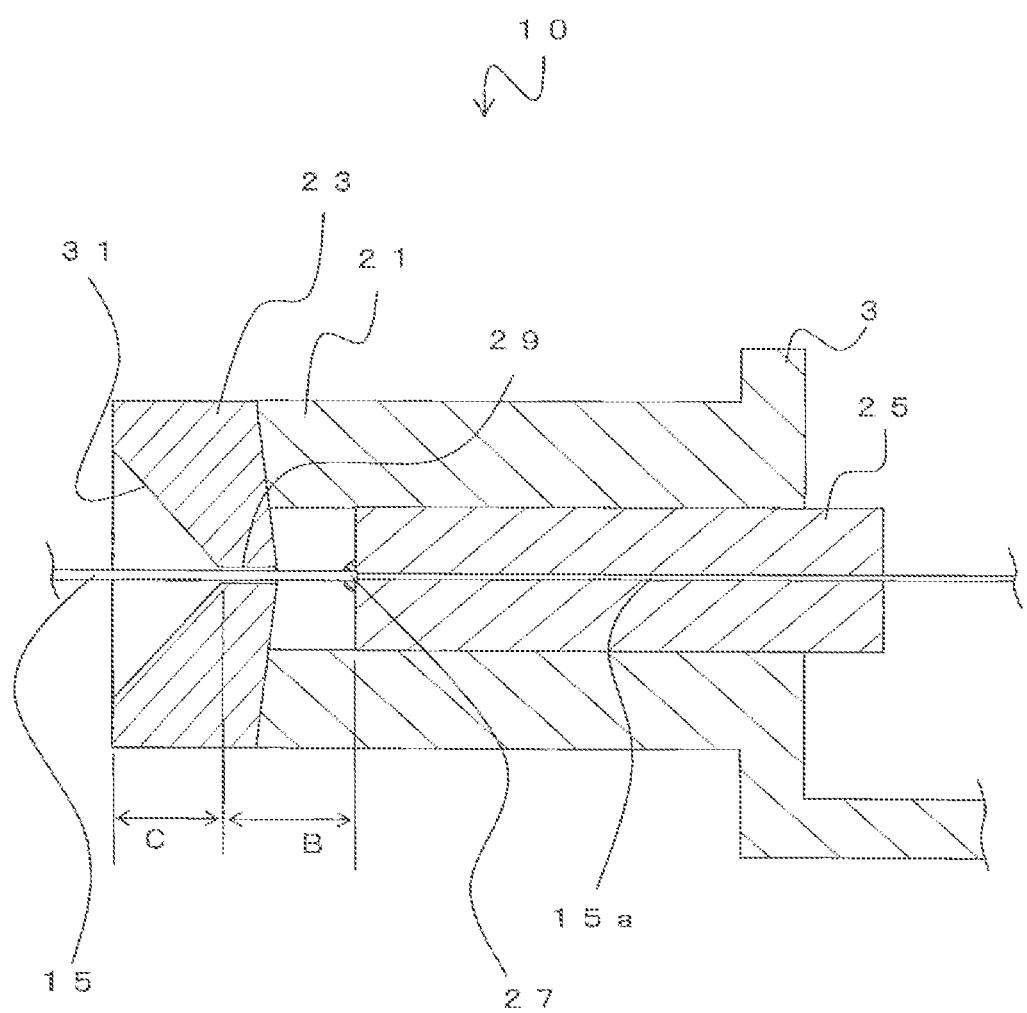
FIG. 5 is a cross sectional view showing another embodiment of the optical fiber drawer structure 10.
Figure 6:
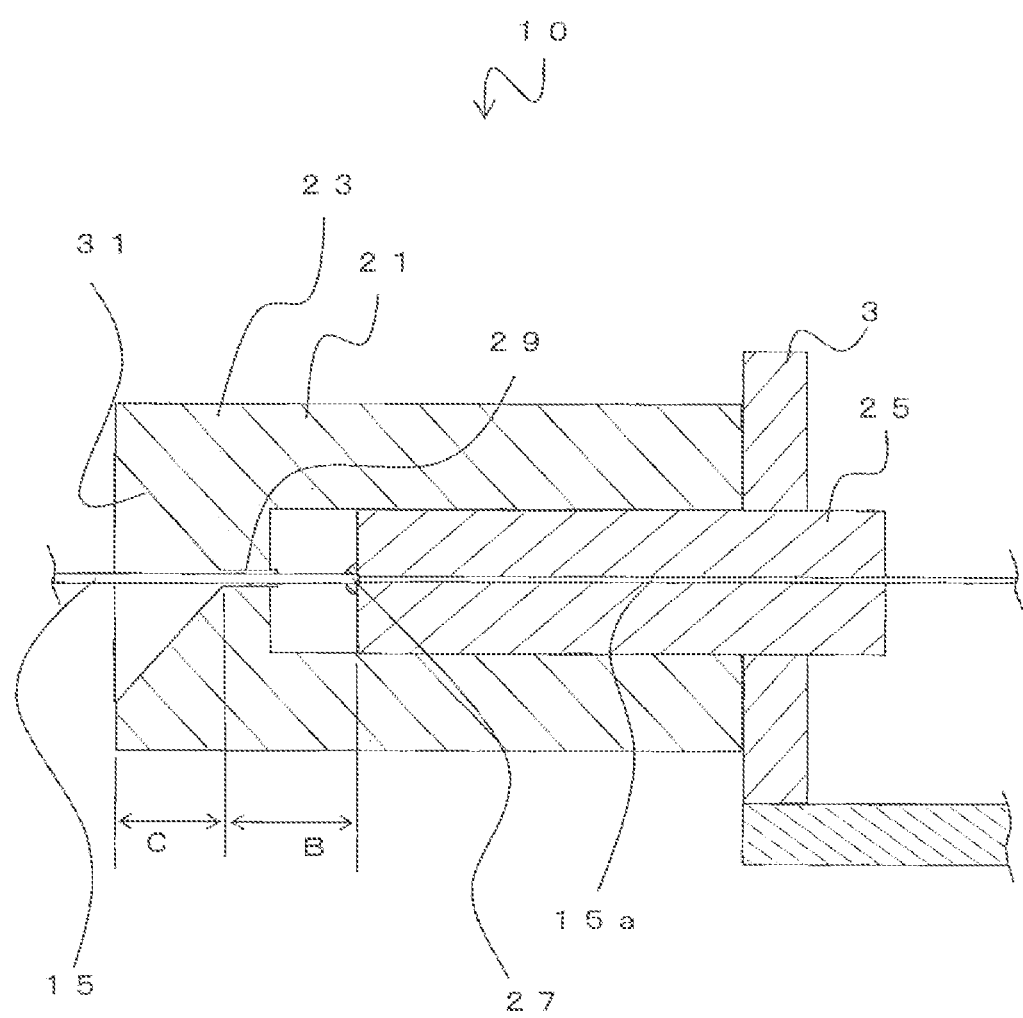
FIG. 6 is a cross sectional view showing another embodiment of the optical fiber drawer structure 10.

Also, instead of forming the sleeve 21 and the housing 3 separately and then joining the two together afterwards, the housing 3 and the sleeve 21 can be formed as a unified body as shown in FIG. 5. Also, instead of forming the sleeve 21 and the lid part 23 separately and then joining the two together afterwards, the lid part 23 and the sleeve 21 can be formed as a unified body as shown in FIG. 6. That is, it may be allowed as long as the sleeve 21 is disposed outside the housing 3 and the lid part 23 is disposed at the tip side of the sleeve 21.

As described above, according to the present embodiment, the reduced diameter part 29 and the expanded diameter part 31 are formed in the lid part 23. Thus, when the optical fiber 15 is bent in a direction approximately vertical to the axial direction of the optical fiber 15, the optical fiber 15 bends from the reduced diameter part 29 along the expanded diameter part 31 so that a large local bending of the optical fiber 15 can be prevented. This can prevent optical fiber 15 from fracturing or the like.

Also, it is unnecessary to use conventional rubber tubes or the like, so there is no fear of deterioration or burning of the tubes heated by cladding mode leaked light of the optical fiber, and the structure is simple.

Also, the reduced diameter part 29 is a predetermined distance away from the fixing part 27, so it is possible to reduce the effect of the bending of the optical fiber 15 given to the fixing part 27.

Also, forming the reduced diameter part 29 for more than a predetermined length can ensure to have a distance between the fixing part 27 and the reduced diameter part 29 (the tip thereof) with certainty.

Figure 7:
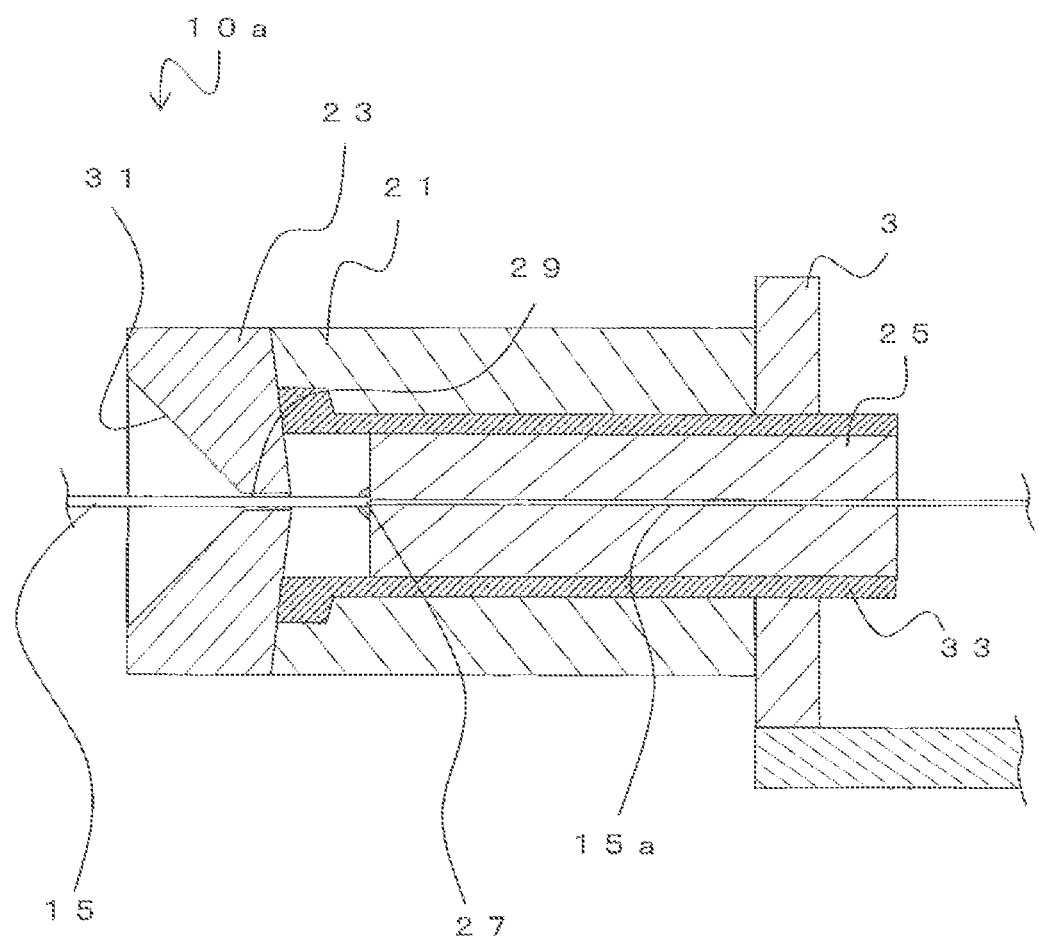

Next, a second embodiment will be described. FIG. 7 is a view showing an optical fiber drawer structure 10a. In the descriptions below, the same notations as in FIG. 1 to FIG. 4A and FIG. 4B will be used for the structures with the same functions as in the optical fiber drawer structure 10, and redundant descriptions will be omitted.

The optical fiber drawer structure 10a has approximately the same structure as the optical fiber drawer structure 10 except that a cylindrical member 33 is used therein. In the descriptions below, although an example in which the expanded diameter part 31 is in a straight-line shape is shown, the staged or curved shape as shown in FIG. 4A and FIG. 4B may also be acceptable.

The cylindrical member 33 is made of metal. The cylindrical member 33 is provided between the sleeve 21 and the fixing member 25. The inner face of the cylindrical member 33 has a surface state in which light transmitting through the optical fiber 15 can be absorbed. Here, 'a surface state in which light can be absorbed' means that the surface has a light absorption property for a wavelength of a laser beam, and its absorption rate at this wavelength, for example, is 30% or more, or preferably 70% or more. To have such a light-absorbing surface state, there are methods such as a blackening treatment and plating of the surface.

In the present embodiment, the fixing member 25 is made of a member having a light transmitting property within a wavelength band of the transmitted laser beam, such as a glass member. The optical fiber 15 and the fixing member 25 are fixed by using an adhesive agent or the like, which has a small light absorption coefficient within the wavelength band of the transmitted laser beam and has a refractive index approximately the same as that of the fixing member 25. Thus, the cladding mode leaked light from the optical fiber 15 (the bare optical fiber 15a) can be introduced inside the fixing member 25. Furthermore, the cylindrical member 33 is fixed to an outer periphery of the fixing member 25 using an adhesive agent or the like, which has a small light absorption coefficient within the wavelength band of the transmitted laser beam and has a refractive index approximately the same as that of the fixing member 25. Thus, the light transmitted through the fixing member 25 enters into the inner face of the cylindrical member 33 and a part of this light is absorbed by the inner face of the cylindrical member 33 and converted into heat.

The heat generated from absorption of the leaked light in the cylindrical member 33 is conducted to the sleeve 21 and the lid part 23 that are in contact with the cylindrical member 33 and then radiated outside from outer surfaces of the sleeve 21 and the lid part 23, or radiated to the housing by heat conduction. For the cylindrical member 33 to absorb light efficiently as heat, a surface processing for light absorption in the wavelength band of the transmitted laser beam may be carried out. For example, nickel black plating or copper blackening treatment may be applied on the surface of the cylindrical member 33.

As above, the cladding mode leaked light of the bare optical fiber 15a is emitted through the fixing member 25 to the outside as heat. This prevents the leaked light from being induced into a coating part of the optical fiber 15 and leaked to the coating of the optical fiber 15, and prevents this leaked part to be heated to high temperature.

The above-mentioned cylindrical member 33 is not always necessary. If the inner surface of the sleeve 21 has a light absorbing surface plating or the like so as to have a light-absorbing surface state, the fixing member 25 and the sleeve 21 may be directly fixed by using an adhesive agent or the like which has a small light absorption coefficient within the wavelength band of the transmitted laser beam and has a refractive index approximately the same as that of the fixing member 25.

Here, part of the light entering the cylindrical member 33 emits from the tip of the cylindrical member 33 to the lid part 23. A clearance is provided between the fixing member 25 and the lid part 23. Also, back faces of the lid part 23 are tapered in shape and, on the cross section in the axial direction of the optical fiber, the surfaces of the lid part 23 facing the fixing member 25 are tilted toward a direction of the cylindrical member 33 (to the outer peripheral side).

Here, as mentioned above, the surface of the lid part 23 may be gold-plated or the like. In such a case, the light emitted from the cylindrical member 33 is reflected efficiently at the back faces of the lid part 23. At this time, the light reflected at the lid part 23 progresses through the fixing member 25, or directly, to the cylindrical member 33. Thus, the cylindrical member 33 can also efficiently absorb the light being reflected by the lid part 23. This can prevent the leaked light from returning back to the optical fiber 15.

According to the second embodiment, the same effects as in the first embodiment can be obtained. Also, by transmitting the cladding mode leaked light to the fixing member 25, heat generated in the cylindrical member 33 can be efficiently emitted. This can prevent the optical fiber 15 from being heated by the leaked light and also prevent the leaked light from being coupled again with the optical fiber 15.

Figure 8:
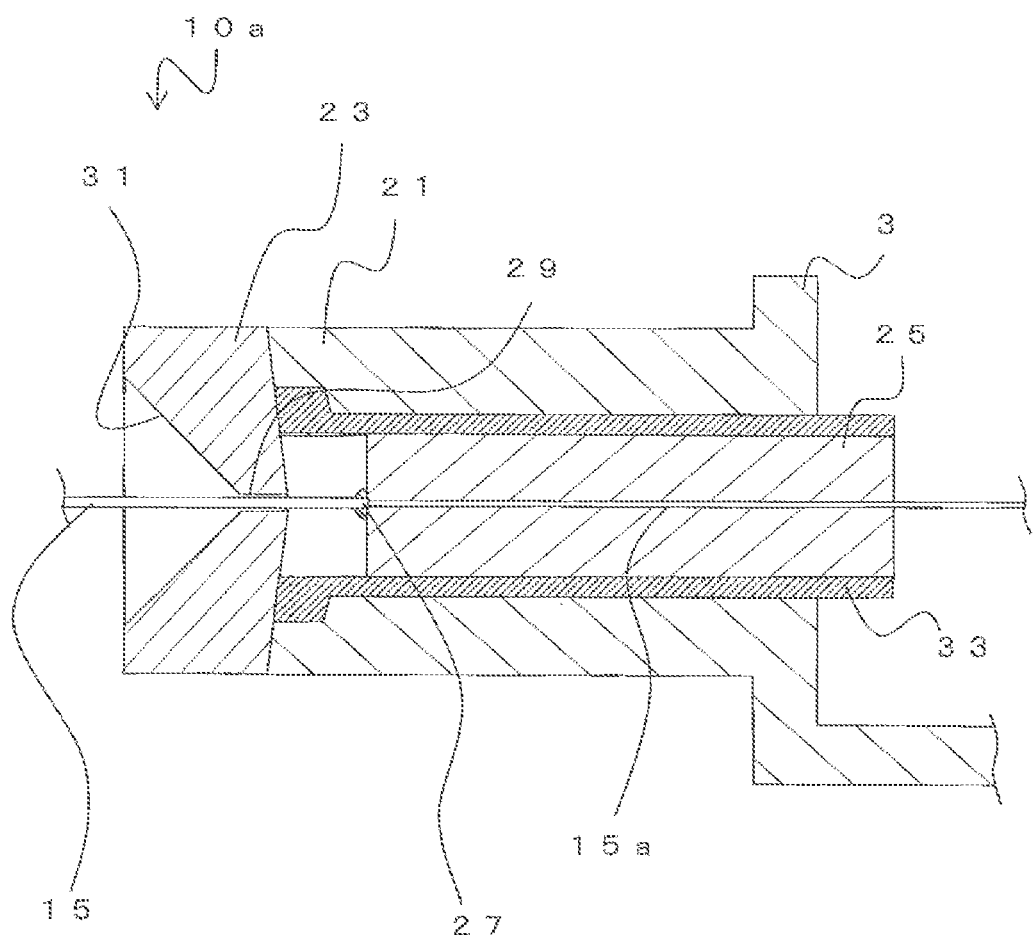

Also in the present embodiment, instead of forming the sleeve 21 and the housing 3 separately and then joining the two together afterwards, the housing 3 and the sleeve 21 can be formed as a unified body as shown in FIG. 8.

Although the embodiments have been described on a basis of typical sizes referring to the attached drawings, the technical scope of the following claims is not limited to the embodiments described above. It is obvious that persons skilled in the art can think out various examples of changes or modifications within the scope of the technical idea disclosed in the claims, and it will be understood that they naturally belong to the technical scope of the present description.

For example, the reduced diameter part 29 may be formed from the rear end of the lid part 23 and an expanded diameter part (a chamfered part) may be formed behind the reduced diameter part 29. That is, the reduced diameter part 29 may be formed at any position of the lid part 23.

What is claimed is:

1. An optical fiber drawer structure of an optical module comprising:
    a housing in which optical components are accommodated;
    a sleeve through which an optical fiber penetrates from an interior of the housing, the sleeve being disposed outside the housing;
    a fixing member which is provided inside the sleeve and fixes the optical fiber to the sleeve; and
    a lid part formed with a reduced diameter part through which the optical fiber is inserted and an expanded diameter part, the reduced diameter part being provided at a tip of the sleeve and formed, on a cross section in an axial direction of the optical fiber, at a position that is a predetermined distance away from a fixing part of the optical fiber and the fixing member, the expanded diameter part being formed further on a tip side than the reduced diameter part and having a larger inner diameter than an inner diameter of the reduced diameter part, wherein:

the reduced diameter part is, on the cross section in the axial direction of the optical fiber, formed to have approximately a constant diameter within a predetermined length range along the axial direction of the optical fiber;

the expanded diameter part is formed so as to be connected to the reduced diameter part;

the lid part and the sleeve are separately formed; and a back surface of the lid part is tilted to the tip side.

2. The optical fiber drawer structure according to claim 1, wherein the lid part is made of a flame-retardant material.

3. The optical fiber drawer structure according to claim 2, wherein the flame-retardant material is a metal.

4. The optical fiber drawer structure according to claim 2, wherein the flame-retardant material is a flame-retardant resin.

5. The optical fiber drawer structure according to claim 1, wherein the expanded diameter part has an inner diameter that increases gradually from the reduced diameter part toward a tip of the lid part.

6. The optical fiber drawer structure according to claim 5, wherein on the cross section in the axial direction of the optical fiber, the expanded diameter part is formed with an angle to the axial direction of the optical fiber increasing in stages.

7. The optical fiber drawer structure according to claim 5, wherein on the cross section in the axial direction of the optical fiber, the expanded diameter part is formed in a curve so that the diameter thereof expands toward the tip side.

8. The optical fiber drawer structure according to claim 1, wherein the housing and the sleeve are constructed as a unified body.

9. The optical fiber drawer structure according to claim 1, wherein the fixing member is made of glass.

10. The optical fiber drawer structure according to claim 9, wherein a metal-made cylindrical member is provided between the sleeve and the fixing member and an inner surface of the cylindrical member is in a state for absorbing light transmitting the optical fiber.

11. The optical fiber drawer structure according to claim 9, wherein an inner surface of the sleeve is in a state for absorbing light transmitting the optical fiber.

12. An optical module comprising:

the optical fiber drawer structure according to claim 1;

a semiconductor laser disposed inside the housing; and a lens for coupling the light from the semiconductor laser with the optical fiber.

* * * * *